United States Patent
Suetsugu

(10) Patent No.: US 7,342,899 B2
(45) Date of Patent: Mar. 11, 2008

(54) NETWORK RECONFIGURATION METHOD, NODE AND LINK CHANGE METHOD, NETWORK RECONFIGURATION PROGRAM, LINK CHANGE PROGRAM, AND RECORDING MEDIUM RECORDING THE PROGRAM

(75) Inventor: Junji Suetsugu, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 673 days.

(21) Appl. No.: 10/800,847

(22) Filed: Mar. 16, 2004

(65) Prior Publication Data

US 2004/0208154 A1 Oct. 21, 2004

(30) Foreign Application Priority Data

Mar. 17, 2003 (JP) ............................. 2003-072272

(51) Int. Cl.
H04Q 7/00 (2006.01)

(52) U.S. Cl. ...................... 370/328; 370/338; 370/346; 370/350; 455/502; 455/41.2

(58) Field of Classification Search ................ 370/328, 370/310, 315, 338–350; 455/41.1–41.2, 455/426.1, 444, 449, 502–503, 507, 512, 455/514, 517, 525

See application file for complete search history.

(56) References Cited

U.S. PATENT DOCUMENTS

| 5,970,067 A * | 10/1999 | Sathe et al. ................. 370/394 |
|---|---|---|
| 6,092,200 A * | 7/2000 | Muniyappa et al. .......... 726/15 |
| 6,859,656 B2 * | 2/2005 | Choi et al. .................. 455/517 |
| 6,879,570 B1 * | 4/2005 | Choi .......................... 370/329 |
| 7,031,288 B2 * | 4/2006 | Ogier ......................... 370/338 |
| 7,158,484 B1 * | 1/2007 | Ahmed et al. .............. 370/350 |
| 7,164,887 B2 * | 1/2007 | Tanada et al. ............. 455/41.2 |
| 7,251,231 B2 * | 7/2007 | Gubbi ........................ 370/336 |
| 2002/0044549 A1 * | 4/2002 | Johansson et al. .......... 370/386 |
| 2002/0055978 A1 * | 5/2002 | Joon-Bo et al. ............ 709/209 |
| 2003/0124979 A1 | 7/2003 | Tanada et al. |
| 2003/0223377 A1 * | 12/2003 | Simmons et al. ........... 370/254 |
| 2004/0032844 A1 * | 2/2004 | Lewis et al. ................ 370/338 |
| 2005/0083859 A1 * | 4/2005 | Kang ......................... 370/310 |
| 2005/0152305 A1 * | 7/2005 | Ji et al. ...................... 370/328 |
| 2007/0109972 A1 * | 5/2007 | MacDonald ................ 370/252 |

FOREIGN PATENT DOCUMENTS

| JP | 2002-111689 A | | 4/2002 |
|---|---|---|---|
| JP | 2002-232433 A | | 8/2002 |
| JP | 2006128846 A | * | 5/2006 |
| WO | WO-0225879 A | | 3/2002 |
| WO | WO-02091685 A | | 11/2002 |

* cited by examiner

Primary Examiner—George Eng
Assistant Examiner—Kamran Afshar
(74) Attorney, Agent, or Firm—Birch, Stewart, Kolasch & Birch, LLP

(57) ABSTRACT

A method of reconfiguring a network including a plurality of sub-networks in which at least one slave terminal is wireless-linked with a master terminal is disclosed. Firstly, each terminal detects a wireless-linkable node. Secondly, detection information including the results of the detections in the terminals is generated. Thirdly, with reference to the generated detection information, a master terminal is selected in such a manner as to minimize the total number of the master terminals. Finally, a sub-network including the selected master terminal is constructed.

9 Claims, 18 Drawing Sheets

FIG. 8

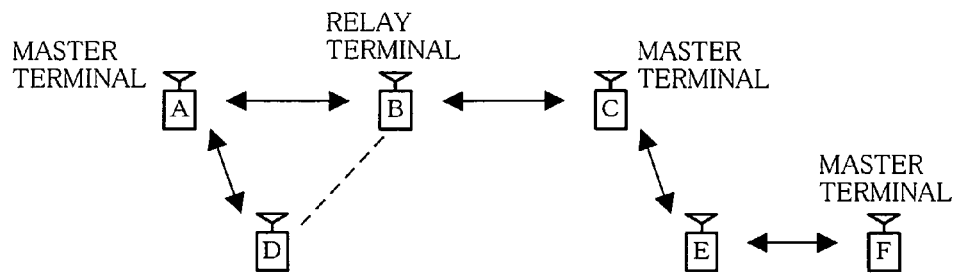

FIG. 9

| RESULT OF DETECTION IN TERMINAL A | | |
|---|---|---|
| TERMINAL B | DETECTED | CONNECTED |
| TERMINAL C | NOT DETECTED | |
| TERMINAL D | DETECTED | CONNECTED |
| TERMINAL E | NOT DETECTED | |
| TERMINAL F | NOT DETECTED | |

| RESULT OF DETECTION IN TERMINAL B | | |
|---|---|---|
| TERMINAL A | DETECTED | CONNECTED |
| TERMINAL C | DETECTED | CONNECTED |
| TERMINAL D | DETECTED | |
| TERMINAL E | NOT DETECTED | |
| TERMINAL F | NOT DETECTED | |

| RESULT OF DETECTION IN TERMINAL C | | |
|---|---|---|
| TERMINAL A | NOT DETECTED | |
| TERMINAL B | DETECTED | CONNECTED |
| TERMINAL D | NOT DETECTED | |
| TERMINAL E | DETECTED | CONNECTED |
| TERMINAL F | NOT DETECTED | |

| RESULT OF DETECTION IN TERMINAL D | | |
|---|---|---|
| TERMINAL A | DETECTED | CONNECTED |
| TERMINAL B | DETECTED | |
| TERMINAL C | NOT DETECTED | |
| TERMINAL E | NOT DETECTED | |
| TERMINAL F | NOT DETECTED | |

| RESULT OF DETECTION IN TERMINAL E | | |
|---|---|---|
| TERMINAL A | NOT DETECTED | |
| TERMINAL B | NOT DETECTED | |
| TERMINAL C | DETECTED | CONNECTED |
| TERMINAL D | NOT DETECTED | |
| TERMINAL F | DETECTED | CONNECTED |

| RESULT OF DETECTION IN TERMINAL F | | |
|---|---|---|
| TERMINAL A | NOT DETECTED | |
| TERMINAL B | NOT DETECTED | |
| TERMINAL C | NOT DETECTED | |
| TERMINAL D | NOT DETECTED | |
| TERMINAL E | DETECTED | CONNECTED |

FIG. 10 (a)

(TERMINALS WITH CIRCLES CAN PARTICIPATE IN NETWORK)

| MASTER TERMINAL | TERMINAL ELIGIBLE TO PARTICIPATE IN NETWORK | | | | | |
|---|---|---|---|---|---|---|
| | TERMINAL A | TERMINAL B | TERMINAL C | TERMINAL D | TERMINAL E | TERMINAL F |
| TERMINAL A | O | O | | O | | |
| TERMINAL B | O | O | O | O | | |
| TERMINAL C | | O | O | | O | |
| TERMINAL D | O | O | | O | | |
| TERMINAL E | | | O | | O | O |
| TERMINAL F | | | | | O | O |

FIG. 10 (b)

(TERMINALS WITH CIRCLES CAN PARTICIPATE IN NETWORK, TERMINALS WITH DOUBLE CIRCLES CAN BE SET AS RELAY TERMINALS)

| MASTER TERMINAL | | TERMINAL ELIGIBLE TO PARTICIPATE IN NETWORK | | | | | |
|---|---|---|---|---|---|---|---|
| | | TERMINAL A | TERMINAL B | TERMINAL C | TERMINAL D | TERMINAL E | TERMINAL F |
| TERMINAL A | TERMINAL B | ◎ | ◎ | O | ◎ | | |
| TERMINAL A | TERMINAL C | O | ◎ | O | O | O | |
| TERMINAL A | TERMINAL D | ◎ | ◎ | | ◎ | | |
| TERMINAL A | TERMINAL E | O | O | O | O | O | O |
| TERMINAL A | TERMINAL F | O | O | | O | | O |
| TERMINAL B | TERMINAL C | O | ◎ | ◎ | O | O | |
| TERMINAL B | TERMINAL D | ◎ | ◎ | | ◎ | | |
| TERMINAL B | TERMINAL E | O | O | ◎ | O | O | O |
| TERMINAL B | TERMINAL F | O | O | O | O | O | O |
| TERMINAL C | TERMINAL D | O | ◎ | | O | O | |
| TERMINAL C | TERMINAL E | | O | ◎ | | ◎ | O |
| TERMINAL C | TERMINAL F | | O | O | | ◎ | O |
| TERMINAL D | TERMINAL E | O | O | O | O | O | O |
| TERMINAL D | TERMINAL F | O | O | | O | O | O |
| TERMINAL E | TERMINAL F | | | O | | ◎ | ◎ |

FIG. 16
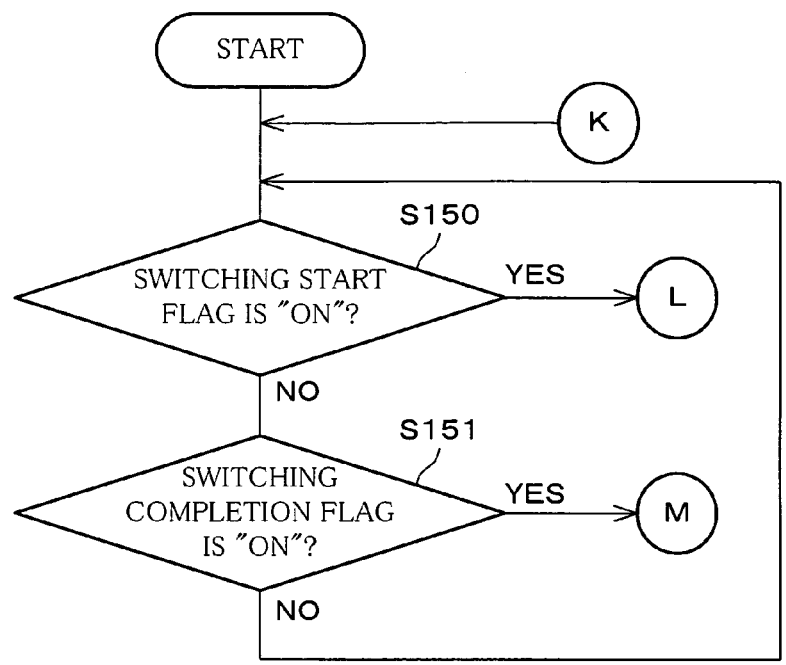
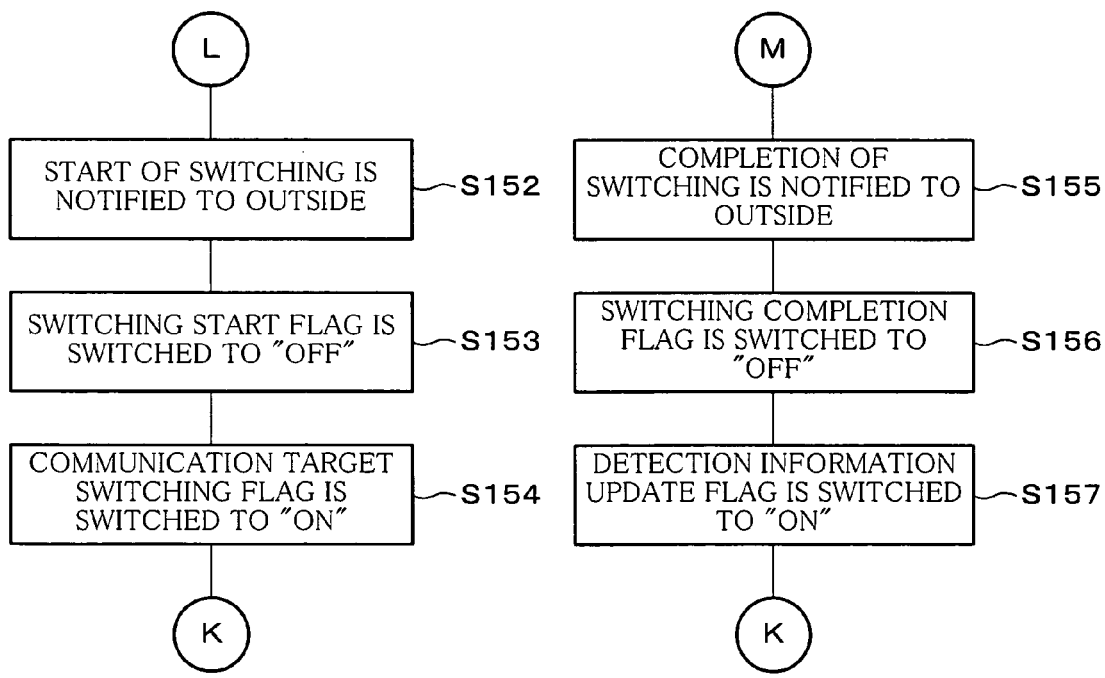

FIG. 17

| RESULT OF DETECTION IN TERMINAL A | | | | |
|---|---|---|---|---|
| TERMINAL B | DETECTED | CONNECTED | PARTICIPATE IN NETWORK | DUAL |
| TERMINAL C | NOT DETECTED | – | PARTICIPATE IN NETWORK | DUAL |
| TERMINAL D | DETECTED | – | – | DUAL |
| TERMINAL E | NOT DETECTED | – | PARTICIPATE IN NETWORK | SLAVE ONLY |

| RESULT OF DETECTION IN TERMINAL B | | | | |
|---|---|---|---|---|
| TERMINAL A | DETECTED | CONNECTED | PARTICIPATE IN NETWORK | DUAL |
| TERMINAL C | DETECTED | CONNECTED | PARTICIPATE IN NETWORK | DUAL |
| TERMINAL D | DETECTED | – | – | DUAL |
| TERMINAL E | NOT DETECTED | – | PARTICIPATE IN NETWORK | SLAVE ONLY |

| RESULT OF DETECTION IN TERMINAL C | | | | |
|---|---|---|---|---|
| TERMINAL A | NOT DETECTED | CONNECTED | PARTICIPATE IN NETWORK | DUAL |
| TERMINAL B | DETECTED | – | PARTICIPATE IN NETWORK | DUAL |
| TERMINAL D | DETECTED | – | – | DUAL |
| TERMINAL E | DETECTED | CONNECTED | PARTICIPATE IN NETWORK | SLAVE ONLY |

| RESULT OF DETECTION IN TERMINAL E | | | | |
|---|---|---|---|---|
| TERMINAL A | NOT DETECTED | – | PARTICIPATE IN NETWORK | DUAL |
| TERMINAL B | NOT DETECTED | – | PARTICIPATE IN NETWORK | DUAL |
| TERMINAL C | DETECTED | CONNECTED | PARTICIPATE IN NETWORK | DUAL |
| TERMINAL D | NOT DETECTED | – | – | DUAL |

NETWORK RECONFIGURATION METHOD, NODE AND LINK CHANGE METHOD, NETWORK RECONFIGURATION PROGRAM, LINK CHANGE PROGRAM, AND RECORDING MEDIUM RECORDING THE PROGRAM

This Nonprovisional application claims priority under 35 U.S.C. § 119(a) on patent application Ser. No. 2003/72272 filed in Japan on Mar. 17, 2003, the entire contents of which are hereby incorporated by reference.

FIELD OF THE INVENTION

The present invention relates to a communications network, and particularly to a network reconfiguration method concerning communications networks for one-to-many communications, such as Bluetooth®, a node and link change method, network reconfiguration program, and a recording medium recording either of these programs.

BACKGROUND OF THE INVENTION

The intercommunication between devices (hereinafter, terminals) with communication facility, such as personal digital assistants (PDAs), notebook PCs, and mobile phones, wire communications through the intermediary of cables, has conventionally been carried out through the intermediary of cables. Examples of such wire communications include RS-232C and USB (Universal Serial Bus).

Meanwhile, a near field wireless communication technology for wireless communication between terminals has been proposed. Typical examples of the near field wireless communication technology include IEEE 802.11, IEEE 802.15, and Bluetooth®.

When a communications network (hereinafter, network) is constructed using the near field wireless communication technology, a terminal for maintaining synchronization on the network is required. Such a terminal is generally termed master or coordinator, but hereinafter the terminal is referred to as master terminal. The master terminal communicate with other terminals so that a one-to-many network is constructed. This type of network is disclosed by, for instance, Japanese Laid-Open Patent Application No. 2002-232433 (Tokukai2002-232433, published on Aug. 16, 2002).

The master terminal has to be chosen in consideration of the reach of radio waves. FIGS. 18(a) and 18(b) show a case that the limited reach of radio waves hinders the construction of a wireless network. Provided that terminals A-D are configured as in FIG. 18(b) and the terminal A is the master terminal, radio waves from the terminal A do not reach the terminal D so that the terminal D cannot participate in the network.

On the other hand, when the terminal B is set as the master terminal as in FIG. 18(b), radio waves from the terminal B reach all of the remaining terminals A, C, and D, so that all of the terminals A-D can participate in the network. In this manner, the user has to grasp the physical relationships between all terminals, in order to select an appropriate terminal as the master terminal.

Furthermore, the master terminal also has to be chosen in consideration of obstacles for wireless communications. FIGS. 19(a) and 19(b) shows a case that an obstacle hinders the construction of a wireless network. Provided that terminals A-D are configured as in FIG. 19(a) and an obstacle exists between the terminals B and D, when the terminal B is the master terminal, radio waves from the terminal B cannot reach the terminal D because of the obstacle, so that the terminal D cannot participate in the network.

On the other hand, when the terminal C is the master terminal as in FIG. 19(b), radio waves from the terminal C reach all of the remaining terminals A, B, and D, so that all of the terminals A-D can participate in the network. In this manner, the user has to grasp the physical relationships between all terminals, in order to select an appropriate terminal as the master terminal.

Furthermore, when the terminals are mobile devices such as mobile phones and PDAs, it is assumed that the terminals are on the move and hence the user cannot properly select the master terminal.

To solve this problem, "Method of Operating Network at Breakaway from Master" disclosed by Japanese Laid-Open Patent Application No. 2002-111689 (Tokukai 2002-111689; published on Apr. 12, 2002) teaches that, when constructing a network of a plurality of communication devices by Bluetooth®, a backup master manages the network if a communication device functioning as a master of the network is not available.

This method includes a stage (a) where coupled information is transmitted from at least one slave out of many slaves existing within a network, a stage (b) of deciding the priority of at least one slave out of the many slaves, used as backup masters based on the above coupled information transmitted in case that it breaks away from a network master, and a stage (c) of broadcasting the priority information of the above decided backup masters to at least one other slave out of many slaves stated above.

According to this method, when the network master is broken away, an appropriate backup master is chosen in accordance with the coupled information having been transmitted, so that the network is managed by this chosen backup master.

However, the method of Japanese Laid-Open Patent Application No. 2002-111689 is effective only when the network master is broken away. Furthermore, when a plurality of one-to-many networks are connected with each other, it is impossible to chose an appropriate backup master so that the network cannot properly be constructed. This complicates the network structure and causes problems such as the increase of overall power consumption of the network due to the existence of many unnecessary master terminals and the reduction of communication speed owing to the increase of retransmission caused by frequent collision of packets.

SUMMARY OF THE INVENTION

The present invention has been done to solve the above-described problem, and aims to provide a network reconfiguration method, link change method, etc. for restraining the increase of overall power consumption of the network and the decrease of communication speed, which are caused by the complication of the network structure.

To achieve the above-described objective, a network reconfiguration method of the present invention, which is for reconfiguring a network including a plurality of sub-networks each including a node (hereinafter, master node) operating in a master mode and at least one node (hereinafter, slave node) operating in a slave mode and being linked with the node operating in the master mode, is characterized by comprising the steps of: (i) causing each node to detect a linkable node: (ii) generating detection information including a result of detection in the step (i); (iii) with reference to the detection information generated in the step (ii), selecting a node becoming the node operating in the master mode, in such a manner as to reduce a total number of nodes operating in the master mode; and (iv) constructing a sub-network including the node selected in the step (iii).

According to this method, to which node each node on the network is linkable is figured out with reference to the detection information generated in the step (ii). With this, the topology of the network can be variously transformed in such a manner as to reduce the number of master nodes. Since the number of the master nodes is reduced, the increase of overall power consumption of the network and the decrease of communication speed are restrained.

Note that, "node" is a generic term indicating devices with communication facility, such as servers and terminal devices.

A node of the present invention, which is eligible to be a part of a sub-network including a node operating in a master mode and at least one node operating in a slave mode and being linked with the node operating in the master mode, and is capable of operating both in the master mode and in the slave mode, is characterized by comprising: detection means for detecting a linkable node; storage means for storing detection information which includes a result of detection of the node, which is obtained by the detection means, and results of detections of other nodes constituting a network including sub-networks including said sub-network; communication means for exchanging the detection information with an outside; master selecting means for selecting, with reference to the detection information, a node becoming the node operating in the master mode, in such a manner as to reduce a total number of nodes operating in the master mode; and construction means for constructing a sub-network by selecting a mode of the node and selecting a target node to be linked with, with reference to a selection by the master selecting means.

According to this arrangement, to which node each node on the network is linkable is figured out with reference to the detection information stored in the storage means. With this, the topology of the network can be variously transformed in such a manner as to reduce the number of master nodes. Since the number of the master nodes is reduced, the increase of overall power consumption of the network and the decrease of communication speed are restrained.

A link change method of the present invention, which is for changing a link of a node which is eligible to be a part of a sub-network including a node operating in a master mode and at least one node operating in a slave mode and being linked with the node operating in the master mode, and is capable of operating both in the master mode and in the slave mode, is characterized by comprising the steps of: (i) detecting a linkable node; (ii) receiving, from an outside, detection information including results of detections of other nodes constituting a network including sub-networks including said sub-network; (iii) updating the received detection information with reference to a result of detection of the node, which is obtained in the step (i); (iv) to the outside, sending the detection information updated in the step (iii); (v) with reference to the detection information updated in the step (iii), selecting a node becoming the node operating in the master mode, in such a manner as to reduce a total number of nodes operating in the master mode; (vi) based on a selection in the step (v), selecting a mode of the node and selecting a target node to be linked with; and (vii) if the target node selected in the step (vi) is different from a current target node, switching the target node.

According to this method, to which node each node on the network is linkable is figured out with reference to the detection information updated in the step (iii). With this, the topology of the network can be variously transformed in such a manner as to reduce the number of master nodes. Since the number of the master nodes is reduced, the increase of overall power consumption of the network and the decrease of communication speed are restrained.

Furthermore, the steps of the network reconfiguration method can be executed by a computer by means of a network reconfiguration program. Similarly, the steps of the link change method can also be executed by a computer by means of a link change program.

Moreover, it is possible to cause an arbitrary computer to execute either the network reconfiguration program or the link change program by storing either of these programs in a computer-readable recording medium.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a block diagram illustrating an example of a network of the embodiment.

FIG. 9 shows detection results of respective terminals of the network, in a tabular form.

Each of FIGS. 10(a) and 10(b) shows the result of an examination with reference to the sets of detection information, which is carried out for figuring out the minimum number of master terminals for realizing intercommunication between all terminals on the network, and the names of these master terminals. FIG. 10(a) shows a case that only one master terminal is provided, while FIG. 10(b) shows a case that two master terminals are provided.

FIG. 16 is a flow chart showing the steps carried out in a notification process unit of the terminal.

FIG. 17 shows another example of detection information in a tabular form.

DESCRIPTION OF THE EMBODIMENTS

The present invention can be applied to any devices such as communication devices constructing a one-to-many network, and a communication system. As an example of such devices, the following will describe a terminal (node) of an embodiment of the present invention with reference to figures. Note that, hereinafter, a terminal communicating in a master mode is referred to as master terminal (master node), while a terminal communicating in a slave mode is referred to as slave terminal (slave node).

Figure 1:
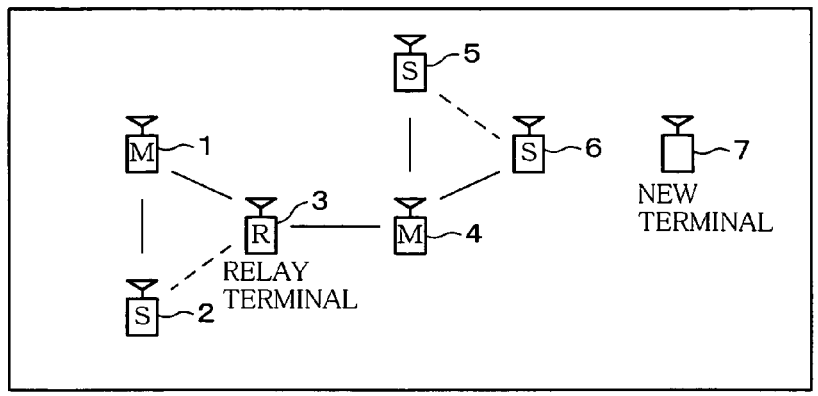
FIG. 1(a) is a block diagram showing an example of a network.
FIG. 1(b) is a block diagram showing a case that a new terminal participates in the network of FIG. 1(a)
FIG. 1(c) is a block diagram showing a network constructed by reconfiguring the network of FIG. 1(b) in accordance with the present invention.
Figure 1:
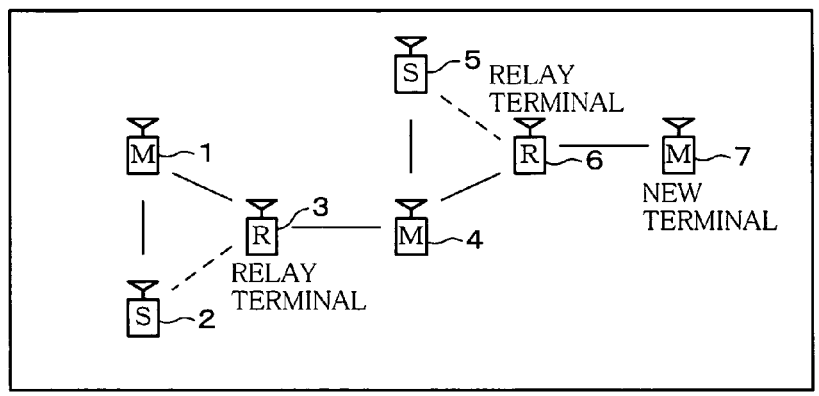
Figure 1:
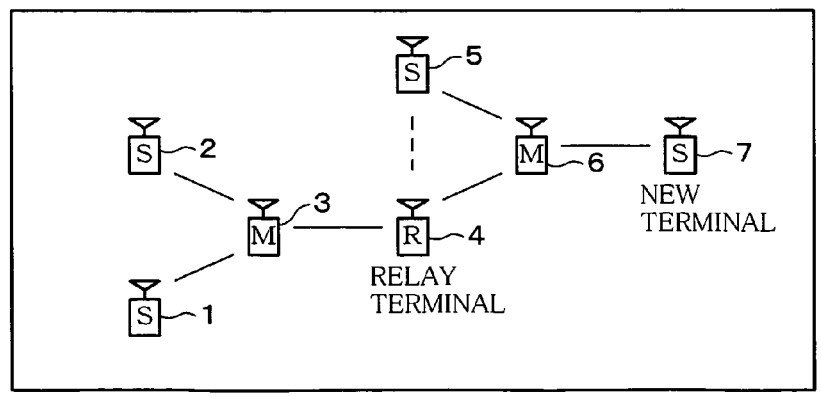

FIG. 1(*a*) shows an example of a network which includes a plurality of one-to-many sub networks are linked each other. In FIGS. 1(*a*)-1(*c*), master terminals are denoted as "M", slave terminals are denoted as "S", and below-mentioned relay terminals are denoted as "R".

Furthermore, full lines between the terminals indicate wireless links between masters and slaves. Meanwhile, dotted lines between the terminals indicate that the terminals are wireless-linkable but wireless links are not established therebetween because, for instance, the terminals are both slaves or at least either of them does not participate in the network.

There are two networks in FIG. 1(*a*): In one network, a terminal 1 is the master and terminals 2 and 3 are slaves. In the other network, a terminal 4 is the master and terminals 5 and 6 are slaves. The terminal 3 is linked to both of the master terminals 1 and 4, thereby acting as an intermediary between two networks. Hereinafter, such a terminal acting as an intermediary will be referred to as relay terminal.

Note that Bluetooth® allows a slave terminal S to wireless-link only one master terminal M, so as not to allow the terminal S to wireless-link a plurality of master terminals M. Thus, a relay terminal R mediates two networks by switching processes in such a way that, a wireless-connection to one master terminal M is carried out in one period, and a wireless-connection to the other master terminal M is carried out in another period.

Provided that a new terminal 7 participates in the network of FIG. 1(*a*), if the new terminal 7 cannot wireless-link the existing master terminals 1 and 4, the new terminal 7 is designated as a master terminal M and the terminal 6 wireless-linked to the new terminal 7 functions as a relay terminal, as shown in FIG. 1(*b*). In this manner, as the number of the master terminals M increases, the number of the relay terminals R also increases.

The present invention transforms a network topology from the state in FIG. 1(*b*) to the state in FIG. 1(*c*) so as to reduce the number of master terminals M. With this, the overall power consumption of the network and the decrease of communication speed are restrained.

Embodiment 1

Figure 2:
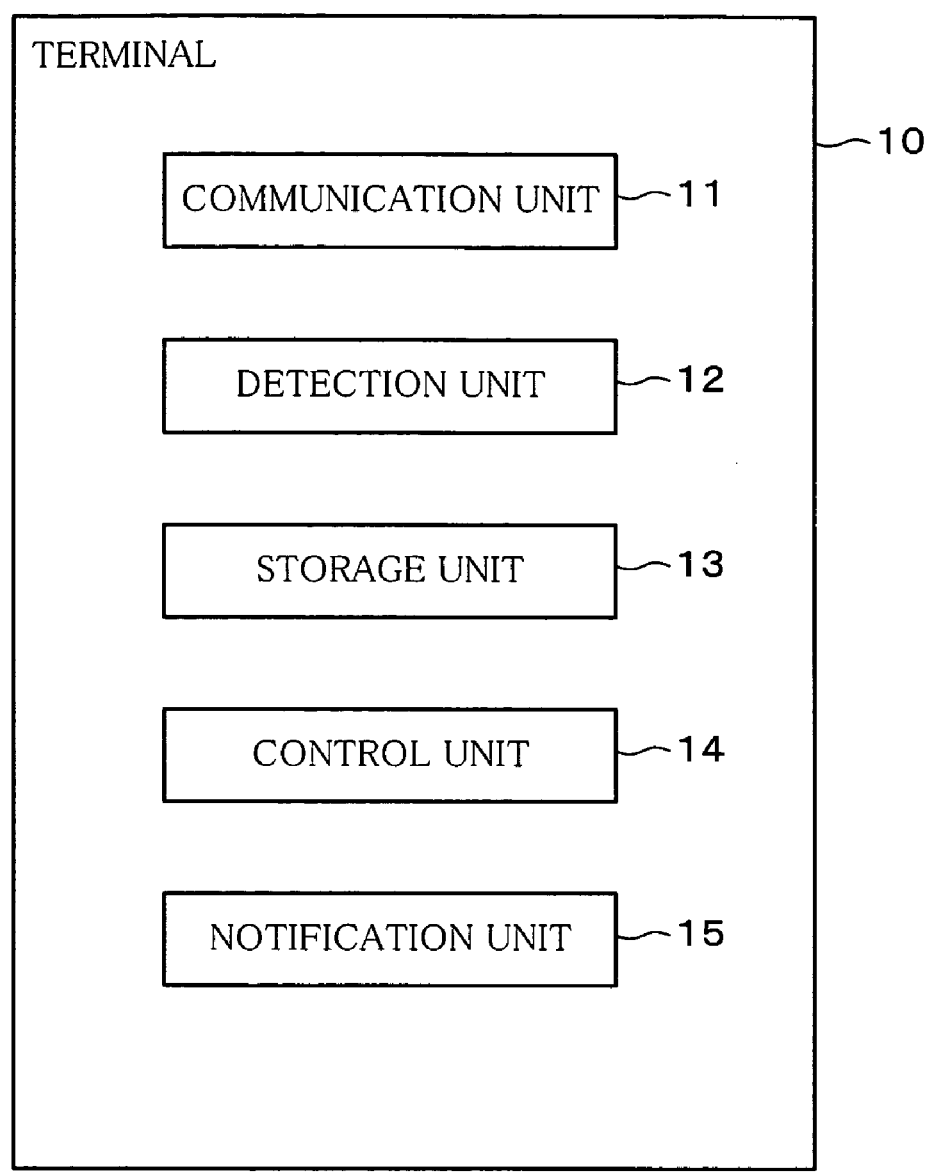
FIG. 2 is a block diagram schematically illustrating a terminal constituting a network of an embodiment of the present invention.

The following will describe an embodiment of the present invention with reference to FIGS. 2-10. FIG. 2 shows the internal structure of a terminal 10 constituting a network of the present embodiment. As the figure shows, the terminal 10 includes: a communication unit (communication means) 11 for communicating with another terminal 10; a detection unit (detection means) 12 for detecting a terminal available for communication; a storage unit (storage means) 13 for storing detection information supplied from the communication unit 11 and the detection unit 12; a control unit (master selecting means, construction means) 14 for controlling the units; and a notification unit (notification means) 15 for carrying out a notification to the outside.

Figure 3:
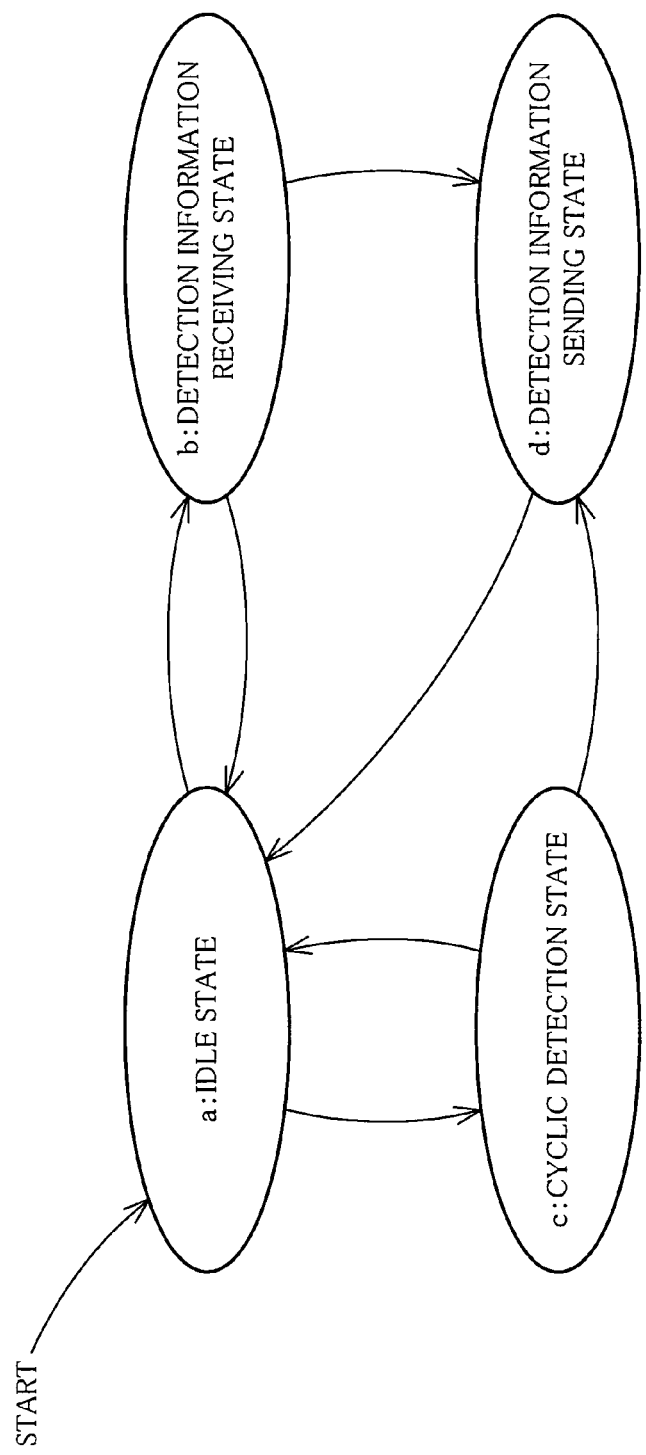
FIG. 3 is a state transition diagram showing the transition of the operating state of the terminal.

FIG. 3 shows the transition of an operating state of the terminal 10 of FIG. 2. As in the figure, the operating state of the terminal 10 is any one of an idle state (a), detection information receiving state (b), cyclic detection state (c), and detection information sending state (d). Note that, at the start of the operation, the terminal 10 is in the idle state.

Now, steps carried out in the respective operating state are described with reference to FIGS. 4-7. Note that, in the flow charts in FIGS. 4-7, the transition to another operating state is indicated by the above-mentioned lowercase letters (a)-(d) attached to the names of the operating states.

Figure 4:
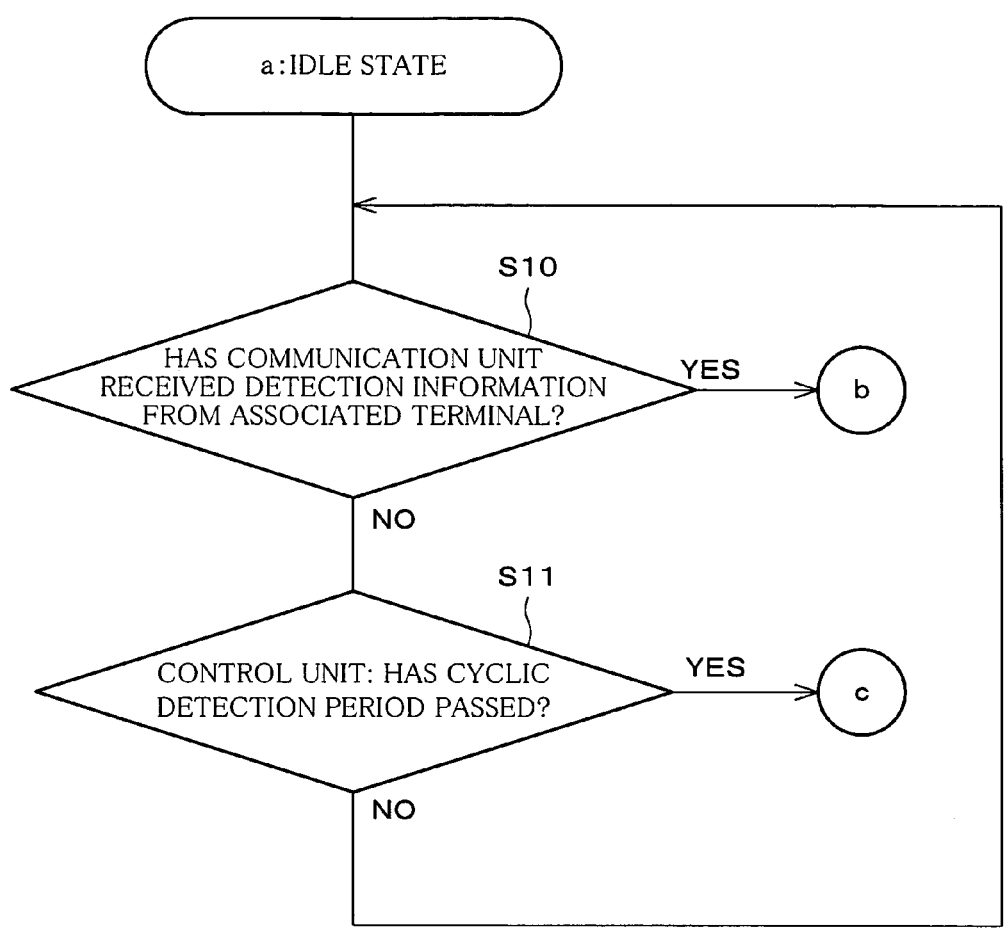
FIG. 4 is a flow chart showing the steps carried out when the terminal is in an idle state.

First, the steps in the idle state (a) are described with reference to FIG. 4. For a start, the communication unit 11 determines if the detection information is received from the associated terminal 10 (Step S10; Hereinafter, steps may be simply described such as "S10"). When it is confirmed that the detection information is received, the operating state transits to the detection information receiving state (b).

On the other hand, if the detection information is not received, a built-in timer of the control unit 14 determines if a predetermined period (hereinafter, cyclic detection period) has passed from the transition to the idle state. If the period has already past (S11), the operating state transits to the cyclic detection state (c). If the period has not yet past, the process returns to Step S10 and the above-mentioned operation is carried out again.

FIG. 17 shows an example of the detection information. In this example, the detection information relates to terminals as the targets of detection, whether or not the detection is successfully done as a result of the detecting step, linked terminals, whether or not a terminal has participated in the network, and whether or not a terminal supports both a master mode and a slave mode. Note that, the terminal D has no detection results as the terminal D has not yet participated in the network.

The cyclic detection period is provided for carrying out the detecting step at certain intervals. For instance, when the cyclic detection period is set so as to be 3 minutes, the terminal carries out the detection of terminals available for communication, at intervals of 3 minutes. The cyclic detection period may be inherent to the terminal or arbitrarily set by the user. Furthermore, there is a feasible method such that, as a table, cyclic detection periods suitable for various locations and circumstances are stored in the terminal, and a suitable one is automatically fetched from the table.

Furthermore, the cyclic detection period is not necessarily fixed to one period. For instance, the cyclic detection period varies each time a detecting is carried out, in the following manner: The cyclic detection period is set to be within the range of 3-10 minutes, and after the first detecting step is carried out, the second detecting step is carried out with an interval of 6 minutes, and after the end of the second detecting step, a third detecting step is carried out with an interval of 8 minutes and then a fourth detecting step is carried out with an interval of 4 minutes.

Alternatively, the following may be carried out: The detecting step is repeatedly carried out when the cyclic detection period is set to be 0, while the cyclical execution of the detecting step is temporarily stopped when the cyclic detection period is set to be infinite or to be a value practically indicates infinite. Note that, the value practically indicates infinite is, for instance, "65535" when the program allows the cyclic detection period to vary within the range of 0-65535 and the value "65535" is defined as infinite rather than an actual value.

Next, the steps carried out in the detection information receiving state (b) are described with reference to FIG. 5. First, the control unit 14 compares the received detection information with detection information stored in the storage unit 13 (S20). If these sets of information are identical (YES in S21), the operating state transits to the idle state (a). Meanwhile, if these sets of information are different from each other (NO in S21), the control unit 14 causes the storage unit 13 to update the detection information stored therein to be in line with the received detection information (S22).

After Step S22, the control unit 14 computes the optimal solution of network construction, with reference to the updated detection information (S23). This Step S23 will be specifically described later. Subsequently, with reference to the computed optimal solution, it is determined whether or not the communication target has to be switched to another terminal (S24). If the switching is unnecessary (NO in S24), the operating state transits to the idle state (a).

Meanwhile, if the switching is necessary (YES in S24), first, the notification unit 15 notifies the outside of the start of switching of the communication target (S25). Subsequently, the communication unit 11 carries out the switching of the communication target (S26).

In response to the switching, the notification unit 15 notifies the outside of the result of the switching (S27), and the storage unit 13 updates the detection information stored therein (S28). Note that, the updating of the detection information in S28 may be, for instance, carried out in such a way that only points of difference between the existing information and the new information are changed. Subsequently, the operating state transits to the detection information sending state (d).

Note that, in Step S23, the computation of the optimal solution of network construction with reference to the detection information is carried out by the control unit 14 to determine an arrangement in which the number of master terminals in the network decreases. With reference to FIGS. 8-10, an example of this determination is discussed below.

In a network shown in FIG. 8, terminals exchanges the detection results so that all of the terminals A-F on the wireless network have a table of detection information as shown in FIG. 9. Based on these sets of detection information, it is determined whether or not all of the terminals can participate in the network on the occasion that at least one terminal is designated as a master terminal(s).

That is, provided that one terminal is designated as a master terminal, it is determined whether or not each terminal can participate in the network, i.e. each terminal is connectable to the master terminal in a wireless manner. As a result, a table shown in FIG. 10(*a*) is obtained. Note that, circles in the table indicate that, when the terminal indicated in the leftmost column is the master terminal, the terminals with the circles can participate in the network.

According to FIG. 10(*a*), when only one master terminal is provided, there is no solution to allow all of the terminals to participate in the network.

Now, provided that there are two master terminals, the result can be figured out basically by causing a table in the case of one terminal to be overlapped with another table in the case of one terminal. As a result, a table shown in FIG. 10(*b*) is obtained.

For instance, when the terminals A and B are designated as master terminals, which terminals can participate in the network is figured out by adding the result of the case when only the terminal A is designated as a master terminal and the result of the case when only the terminal B is designated as a master terminal.

In FIG. 10(*b*), while the meaning of circles is identical with those in FIG. 10(*a*), double circles in the figure indicate that these terminals with the double circles can participate in the network no matter which one of the terminals in the leftmost columns is designated as the master terminal. Such terminals with the double circles can be set as relay terminals which act as mediators of data transfer between a sub-network group in which the terminal described on the left side of the "master terminal" column is designated as a master terminal and a sub-network group in which the terminal described on the right side of the column is designated as a master terminal. It has to be remembered that, without such an intermediary terminal, it is impossible to cause all of the terminals to participate in the network when a plurality of master terminals are provided.

Checking the combinations of two master terminals with reference to FIG. 10(*b*), one can see that all of the terminals can participate in the network when the terminals B and E are designated as master terminals. Note that, according to FIG. 10(*b*), all of the terminals have circles also in the cases of the combinations of the terminals A and E, B and F, and D and E. However, in these cases there is no double-circled terminal which is eligible to be a relay terminal, so that the network including all of the terminals cannot be established.

As described above, the optimal solution with the least number of master terminals is found out by gradually increasing the number of master terminals until finding a case that all of the terminals can participate in the network.

Note that, in some cases there are a plurality of optimal solutions for the identical number of master terminals. In such cases it is preferable that one solution out of these optimal solutions is selected in accordance with a predetermined rule such as a terminal with a smaller address number is preferred as a master terminal.

In the present embodiment, the detection results are either "detected" or "not detected" as shown in FIG. 9. However, the optimal solution may be figured out in such a manner that detection frequencies are figured out by, for instance, counting how many times the detection is succeeded when the detection is carried out 10 times, and a network is constituted by terminals with high detection frequencies.

Figure 5:
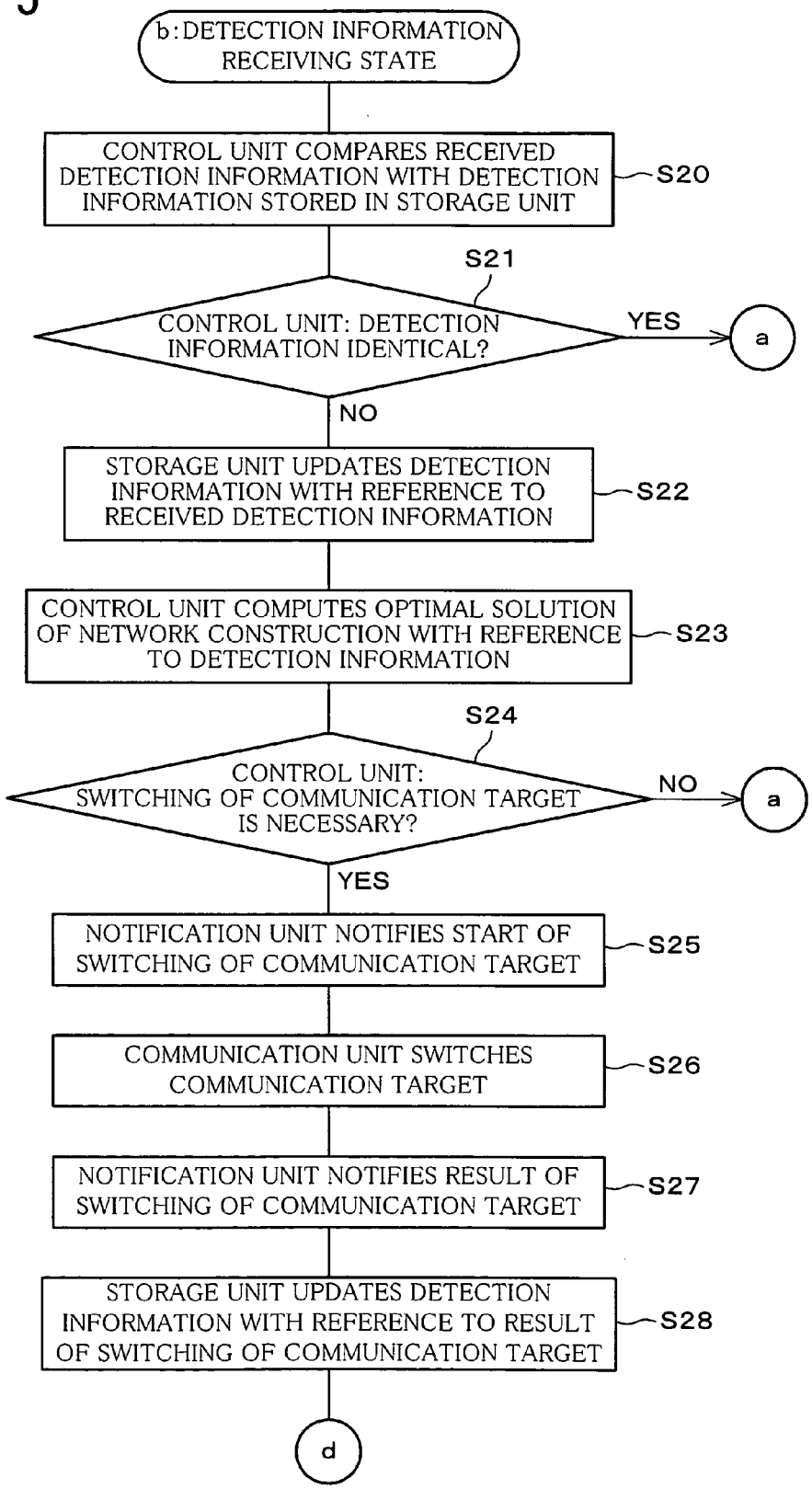
FIG. 5 is a flow chart showing the steps carried out when the terminal is in a detection information receiving state.

In the detection information receiving state (b) shown in FIG. 5, the state information notified to the outside by the notification unit 15 includes sets of information concerning the start of the switching in Step S25 and the result of the switching in Step S27. This state information is provided for allowing higher layers such as a transport layer and network layer to temporarily stop the data transmission during the switching and to alter routing information in connection with the switching.

Thus, when the data transmission cannot be done during the switching, a higher-level application can temporarily stop the data transmission or alter the routing information with reference to the result of the switching so as to securely transmit the data to the target. The notification unit 15 may also be used for notifying the user of the switching, through the intermediary of a device such as a display panel on the terminal.

Figure 6:
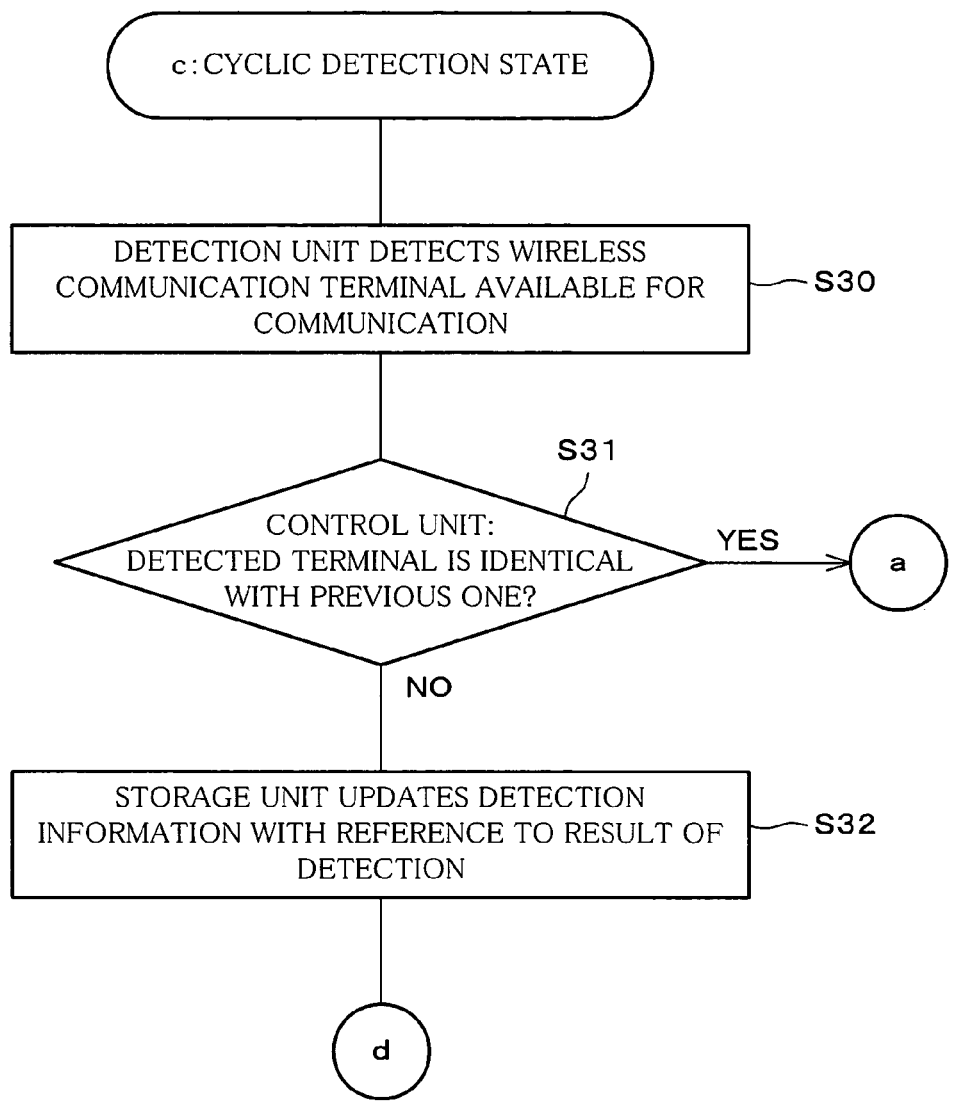
FIG. 6 is a flow chart showing the steps carried out when the terminal is in a cyclic detection state.

Now, the steps in the cyclic detection state are described with reference to FIG. 6. First, the detection unit 12 carries out a detecting step so as to determine if there is a terminal which is available for communication (S30), and the control unit 14 determines whether or not the result of the detection from the detection unit 12 is identical with the previous detection result stored in the storage unit 13 (S31). If these sets of information are identical with each other, the operating state transits to the idle state (a).

Meanwhile, if it is determined that the sets of information are different from each other, the detection information stored in the storage unit 13 is updated with reference to the result of the detection of this time around (S32). Then the operating state transits to the detection information sending state (d).

Figure 7:
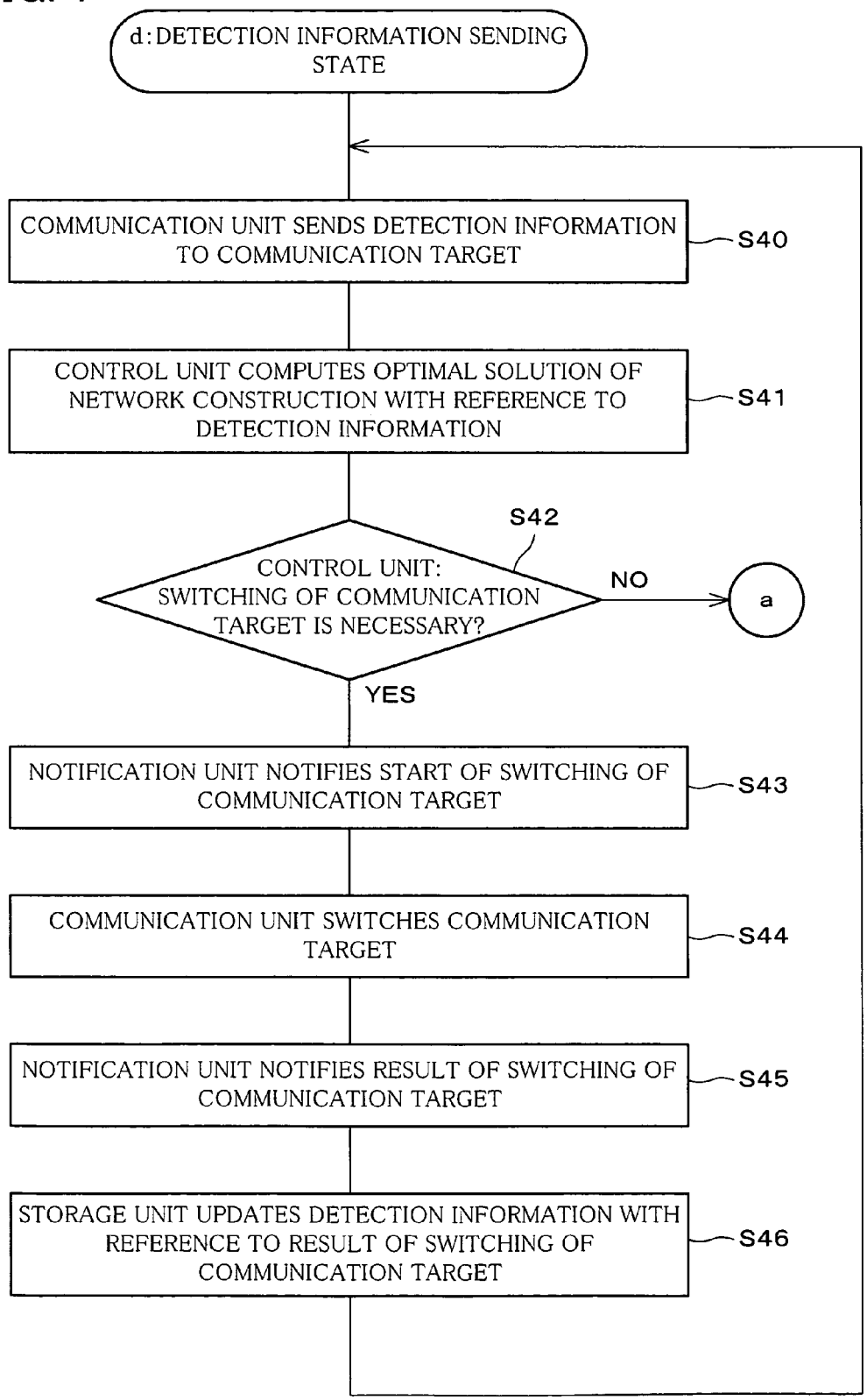
FIG. 7 is a flow chart showing the steps carried out when the terminal is in a detection information sending state.

Now the steps carried out in the detection information sending state are described with reference to FIG. 7. First, the communication unit 11 supplies the detection information stored in the storage unit 13 to the associated terminal (S40), and the control unit 14 computes the optimal solution of network construction with reference to the detection information stored in the storage unit 13 (S41). Note that this computation of the optimal solution is carried out in the same manner as in Step S23.

Then the control unit 14 compares the terminal indicated by the optimal solution with the currently-associated terminal, and determines whether or not the communication target has to be switched (S42). If the terminal indicated by the optimal solution is identical with the currently-associated terminal so that the switching is unnecessary, the operating state transits to the idle state (a).

Meanwhile, if the terminal indicated by the optimal solution is different from the currently-associated terminal so that the switching is necessary, the notification unit 15 notifies the outside of the start of the switching of the communication target (S43), and the communication unit 11 switches the communication target (S44). In response to the result of the switching, the notification unit 15 notifies the outside of the result of the switching (S45), and the storage unit 13 updates the detection information stored therein (S46). Subsequently, these steps are repeated from Step S40.

In consequence of these steps, the network topology is transformed using the detection information in such a manner as to reduce the number of master terminals, and hence the overall power consumption of the network and the decrease of communication speed are restrained.

Furthermore, the optimal solution of network construction is figured out so that the number of master terminals necessary for constructing the network is set to be minimum. On this account, the overall power consumption of the network and the decrease of communication speed are restrained as much as possible.

In addition, since the start and result of the switching is notified to the outside, the loss of data due to the data transmission to a terminal in the course of the switching can be prevented by stopping data transmission to a terminal in the course of the switching or altering the routing information.

Embodiment 2

Figure 11:
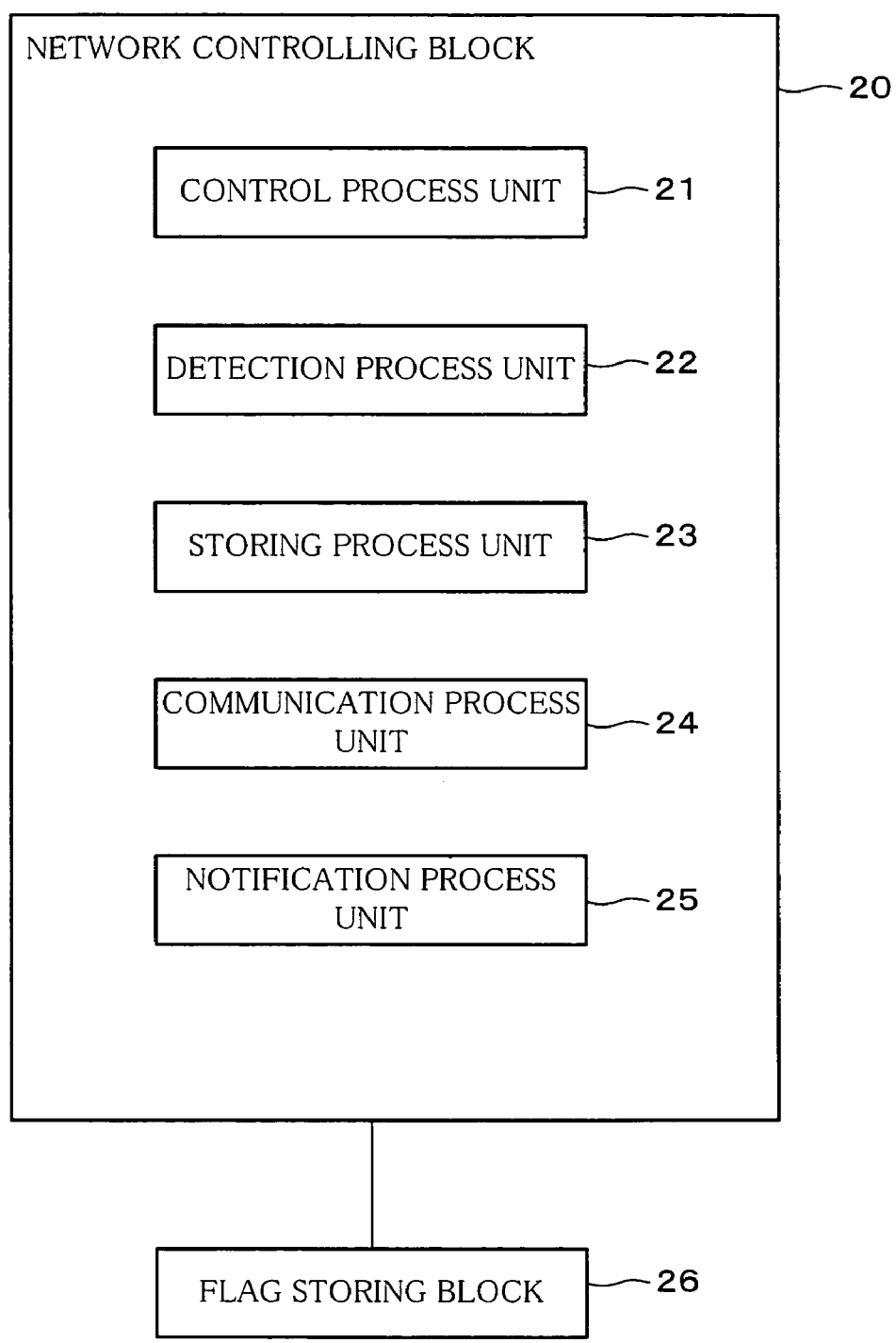
FIG. 11 is a block diagram illustrating network control carried out in a terminal of a network in accordance with another embodiment of the present invention.

Now another embodiment of the present invention is discussed with reference to FIGS. 11-17. FIG. 11 shows a communication device which is compliant with the communication method of the present invention. This communication device includes a network controlling block 20 and a flag storing block 26.

The network controlling block 20 includes a control process unit (master selecting means, construction means) 21 for controlling the system, a detection process unit (detection means) 22 for detecting a communication terminal available for communication, a storing process unit (storage means) 23 for storing detection information, a communication process unit (communication means) 24 for communicating with another communication terminal, and a notification process unit (notification means) 25 for carrying out a notification to the outside. These units 21-25 can simultaneously carry out the respective processes. For the cooperation between the units 21-25, the flag storing block 26 stores a detection information comparison flag, detection information update flag, detection information sending flag, optimal solution computation flag, cyclical detection flag, switching start flag, communication target switching flag, and switching completion flag.

Referring to FIGS. 12-17, the processes carried out by the units 21-25 are described. Note that, flags stored in the flag storing block 26 are "OFF" in the initial state.

Figure 12:
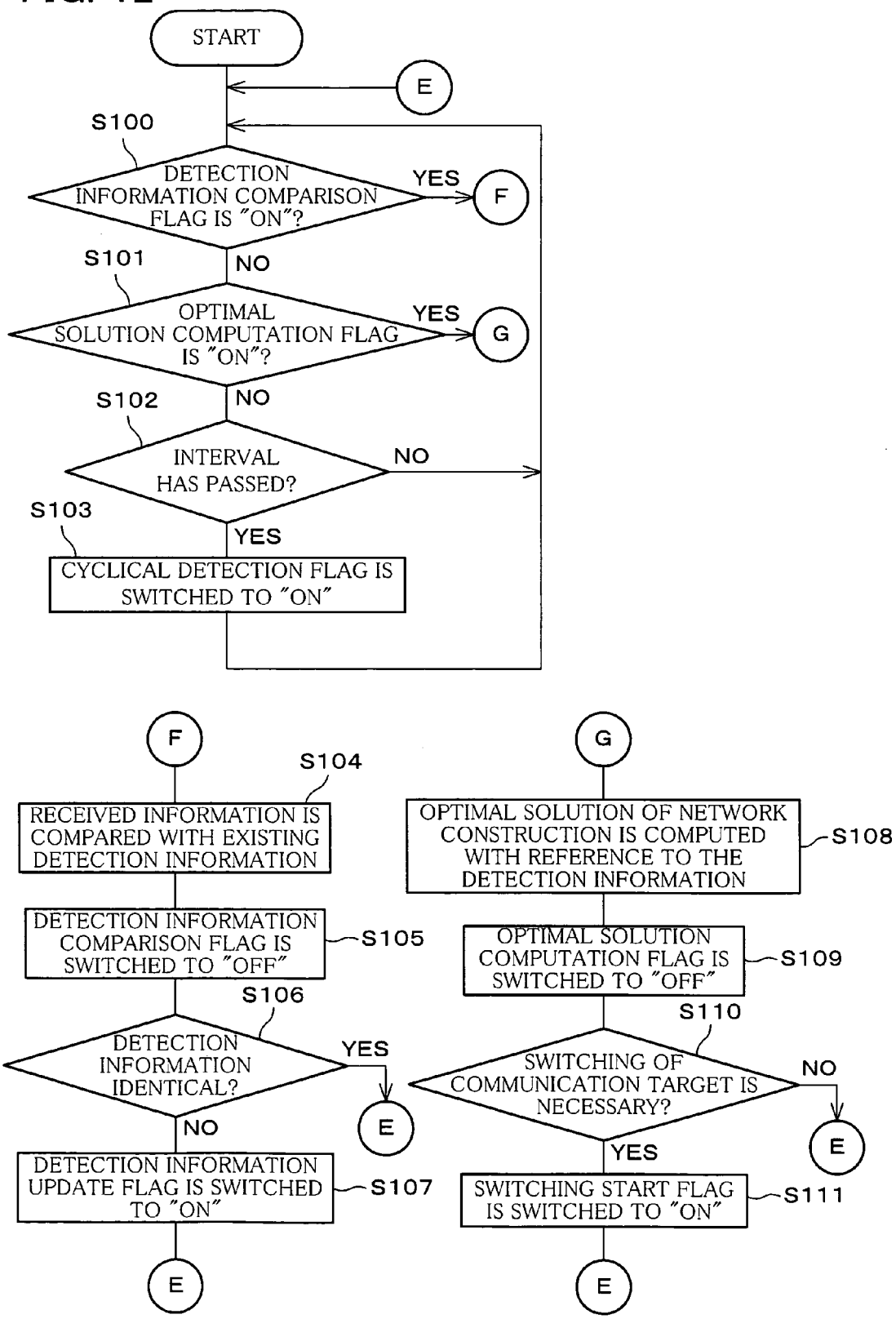
FIG. 12 is a flow chart showing the steps carried out in a control process unit of the terminal.

First, the process carried out by the control process unit 21 is discussed with reference to FIG. 12. For a start, the control process unit 21 determines whether or not the detection information comparison flag is "ON" (S100).

When the flag is ON, the unit 21 compares the received information with the existing detection information (S104), and switches the detection information comparison flag to "OFF" (S105). If the result of the comparison suggests that these sets of information are identical (YES in Step S106), the process goes back to Step S100. Meanwhile, if these sets of information are different from each other (NO in Step S106), the unit 21 switches the detection information update flag to "ON" (S107) and then the process goes back to Step S100.

If, in Step S100, the detection information comparison flag is "OFF", the control process unit 21 determines whether or not the optimal solution computation flag is "ON" (S101).

If the flag is "ON", the unit 21 computes the optimal solution of network construction with reference to the detection information (S108), and switches the optimal solution computation flag to "OFF" (S109). Next, the unit 21 compares the communication target suggested by the computed optimal solution with the current communication target, and determines whether or not the communication target has to be switched (S110). If it is determined that the these communication targets are identical so that the switching is unnecessary, the process goes back to Step S100. Meanwhile, if these communication targets are different from each other and the switching is necessary, the unit 21 switches the switching start flag to "ON" (S111) and then the process goes back to Step S100.

If, in Step S101, the optimal solution computation flag is "OFF", the control process unit 21 determines whether or not a predetermined interval has passed (S102). If the interval has not passed, the process goes back to Step S100. If the interval has passed, the unit 21 switches the cyclical detection flag to "ON" (S103) and the above-described operations are repeated from Step S100.

Figure 13:
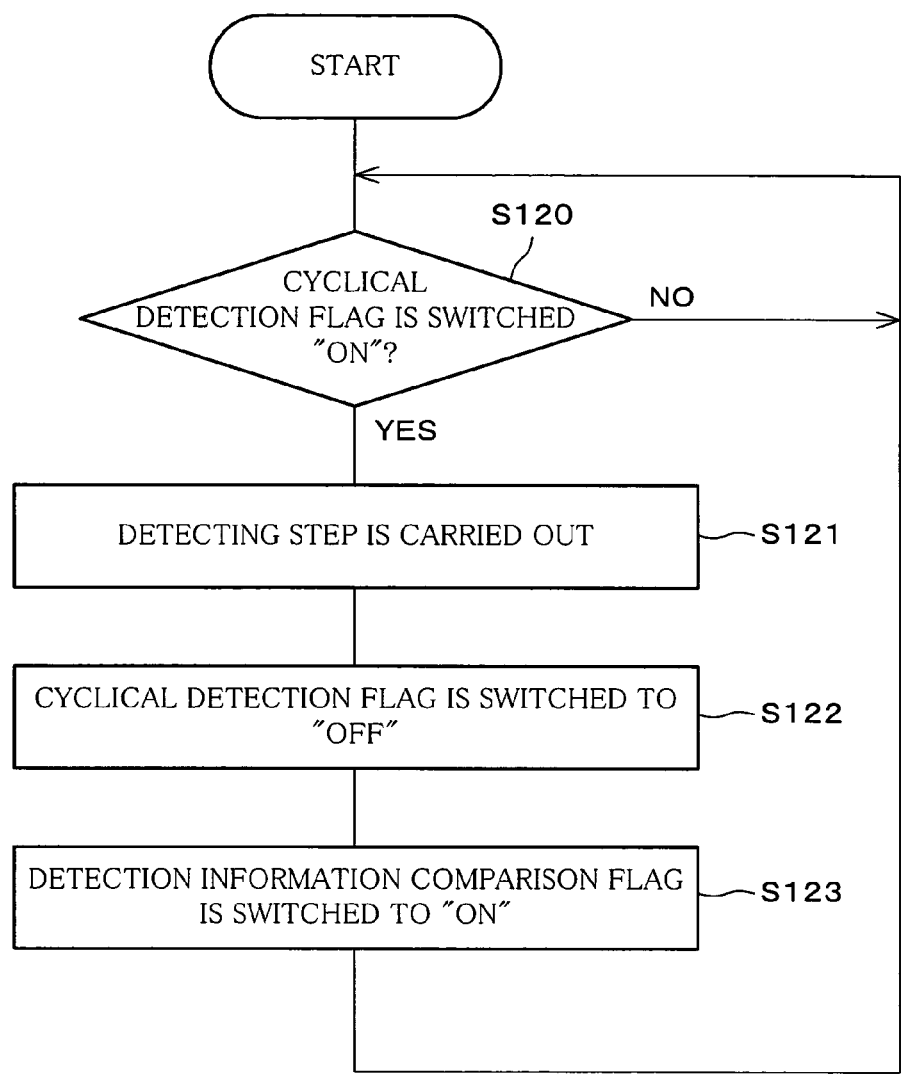
FIG. 13 is a flow chart showing the steps carried out in a detection unit of the terminal.

Next, the process carried out by the detection process unit 22 is discussed with reference to FIG. 13. The detection process unit 22 waits until the cyclical detection flag is switched "ON" (S120). When the flag is switched "ON", the unit 22 carries out the detecting step so as to detect a terminal available for communication (S121). After the detecting step, the unit 22 switches the cyclical detection flag to "OFF" (S122) and the detection information comparison flag to "ON" (S123). Subsequently, the above-described operations are repeated from Step S120.

Figure 14:
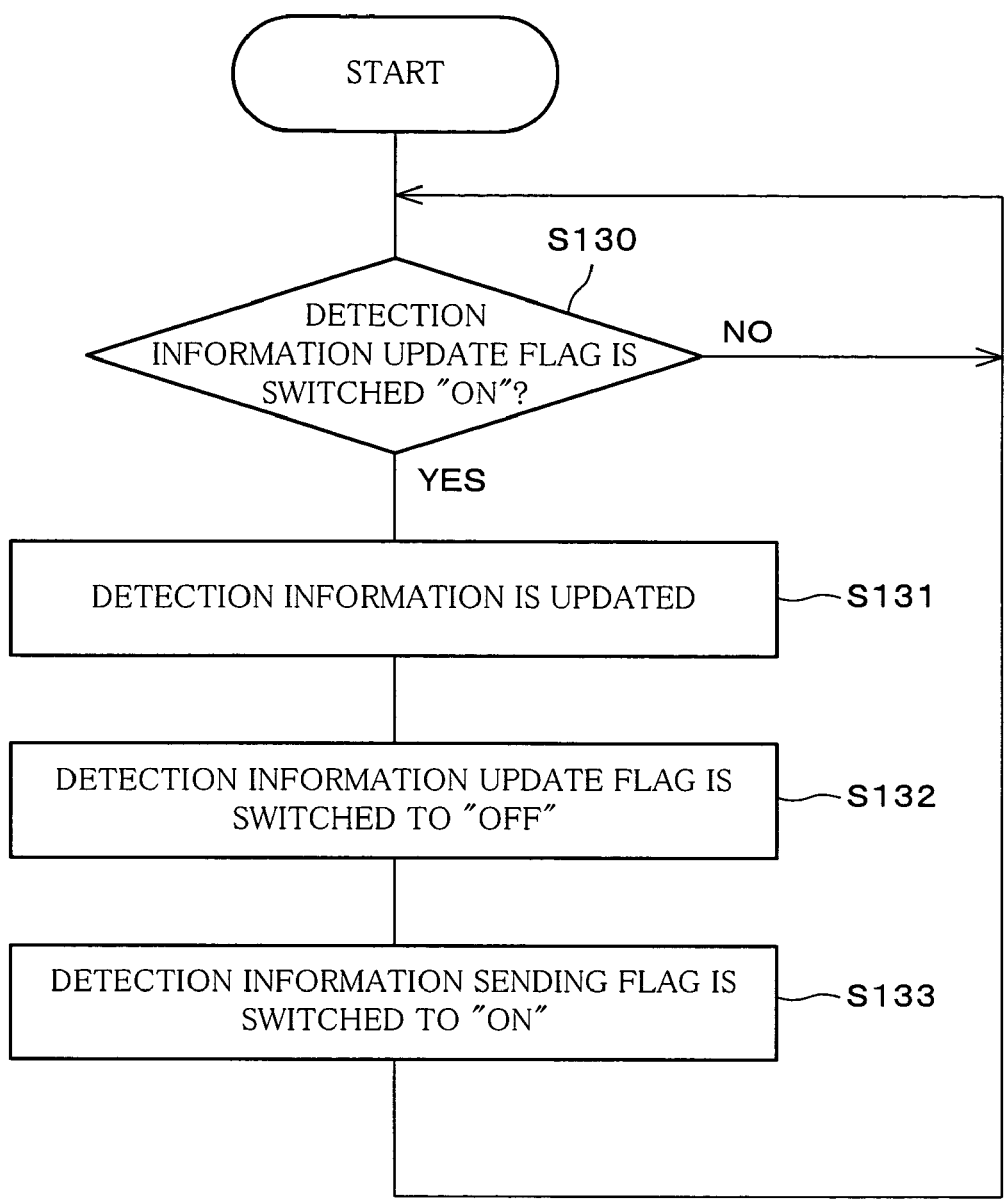
FIG. 14 is a flow chart showing the steps carried out in a memory storage unit of the terminal.

Now the process carried out by the storing process unit 23 is discussed with reference to FIG. 14. The storing process unit 23 waits until the detection information update flag is switched "ON" (S130). When the flag is switched "ON", the unit 23 updates the detection information (S131), switches the detection information update flag to "OFF" (S132), and switches the detection information sending flag to "ON" (S133). Subsequently, the above-described operations are repeated from Step S130.

Figure 15:
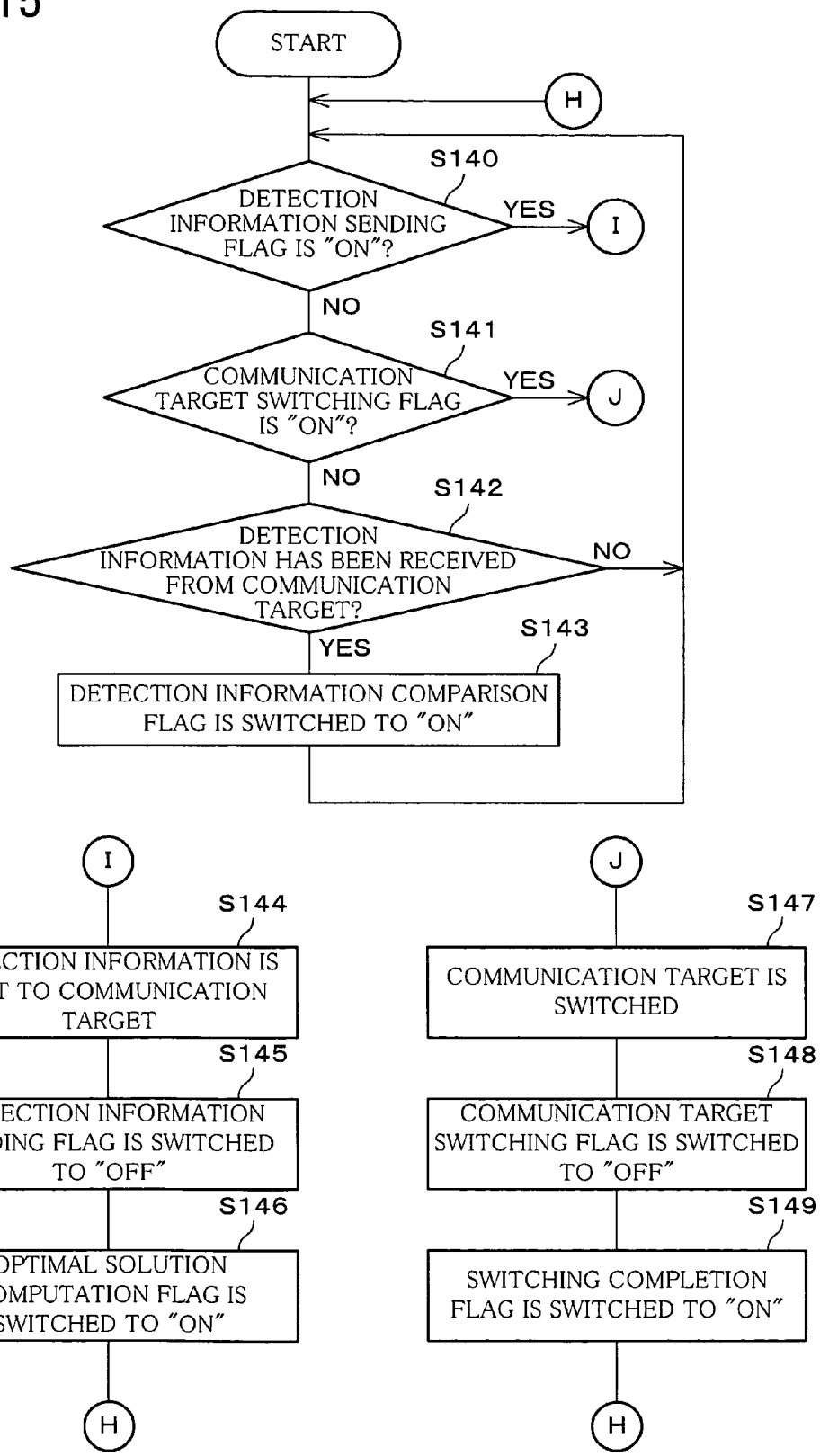
FIG. 15 is a flow chart showing the steps carried out in a communication process unit of the terminal.
Figure 18:
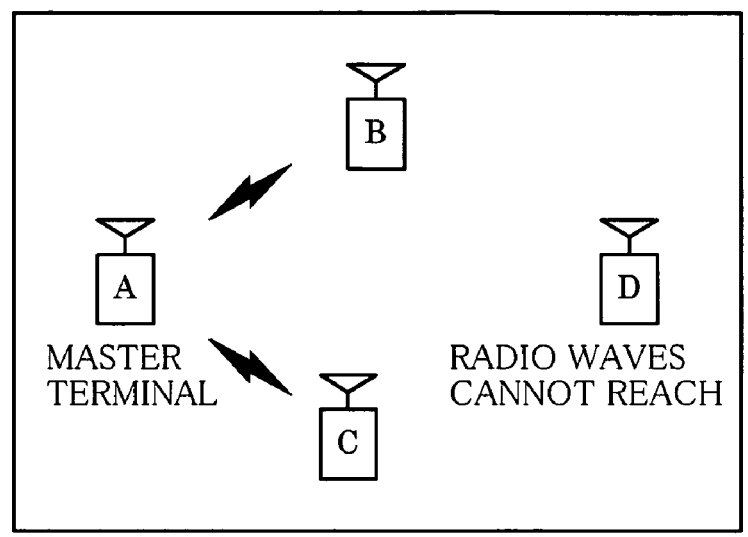
FIGS. 18(*a*) and 18(*b*) are block diagrams for explaining how the limited reach of radio waves hinders the construction of a network.
Figure 18:
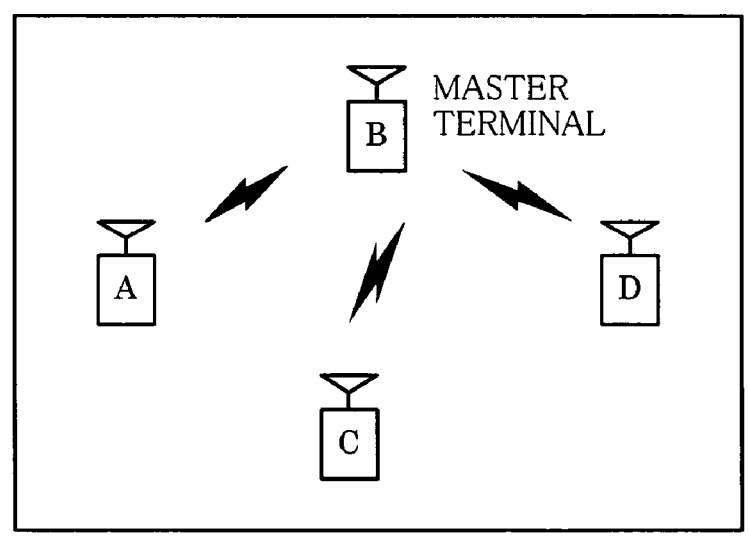
Figure 19:
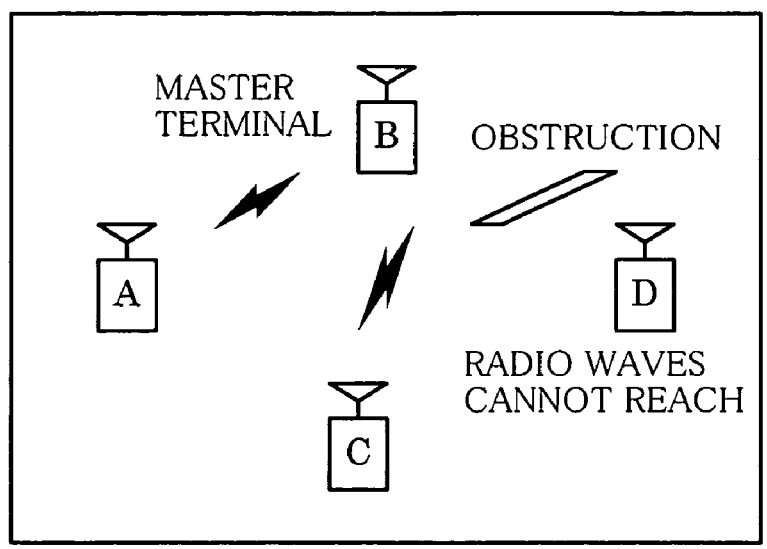
FIGS. 19(*a*) and 19(*b*) are block diagrams for explaining how an obstacle hinders the construction of a network.
Figure 19:
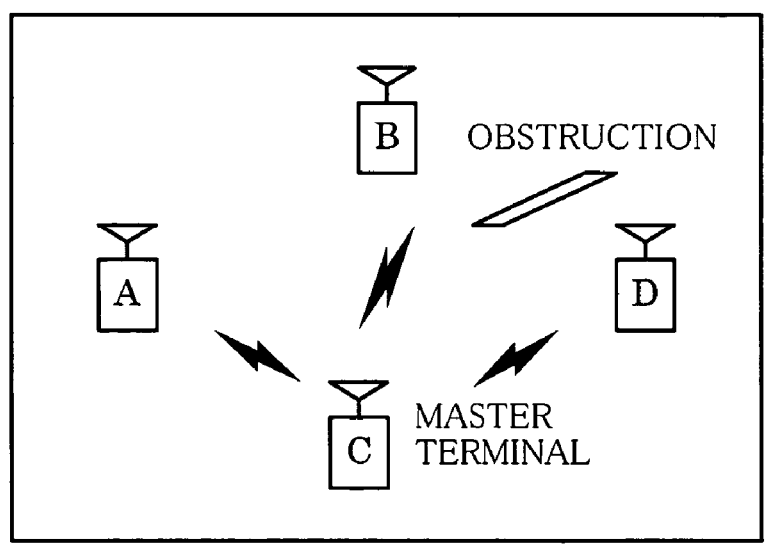

The process carried out by the communication process unit 24 is discussed with reference to FIG. 15. First, the communication process unit 24 determines whether or not the detection information sending flag is "ON" (S140).

If the flag is "ON", the unit 24 sends the detection information to the communication target (S144), switches the detection information sending flag to "OFF" (S145), and switches the optimal solution computation flag to "ON" (S146). Then the process goes back to Step S140.

Meanwhile, if, in Step S140, the detection information sending flag is "OFF", the communication process unit 24 determines whether or not the communication target switching flag is "ON" (S141).

If the flag is "ON", the unit 24 switches the communication target (S147), switches the communication target switching flag to "OFF" (S148), and switches the switching completion flag to "ON" (S149). Then the process goes back the Step S140.

In the meantime, if, in Step S141, the communication target switching flag is "OFF", the communication process unit 24 determines whether or not the detection information has been received from the communication target (S142). If no information has been received, the process goes back to Step S140. If the information has been received, the unit 24 switches the detection information comparison flag to "ON" (S143), and the above-described steps are repeated from Step S140.

Next, the steps carried out by the notification process unit 25 are discussed with reference to FIG. 16. First, the notification process unit 25 determines whether or not the switching start flag is "ON" (S150).

When the flag is "ON", the unit 25 notifies the outside of the start of the switching (S152), switches the switching start flag to "OFF" (S153), and switches the communication target switching flag to "ON" (S154). Then the process goes back to Step S150.

Meanwhile, if, in Step S150, the switching start flag is "OFF", the notification process unit 25 determines whether or not the switching completion flag is "ON" (S151).

when the flag is "ON", the unit 25 notifies the outside of the completion of the switching (S155), switches the switching completion flag to "OFF" (S156), and switches the detection information update flag to "ON" (S157). Subsequently, the above-mentioned operations are repeated from Step S150.

Note that, although the present embodiment is discussed on the basis of the wireless network for wireless communications, the present embodiment can be realized by a wire communication network for wire communications, as long as the network has one-to-many linkage and includes nodes which can operate in both the master mode and slave mode.

Furthermore, the present invention may be arranged in such a manner that a computer-readable recording medium stores the above-described steps so as to cause a computer to execute the steps. With this, it is possible to carry and freely distribute a recording medium storing a program for executing the above-mentioned steps.

Such a recording medium may be a program medium such as a memory (not illustrated) for microcomputers, such as ROM, or may be a program medium inserted to a program reader device as an external storage device (not illustrated) so as to be read.

In any event, the program being stored in the medium is preferably executed by the action of a microprocessor. Moreover, it is preferable that the stored program is read out and the program being read out is downloaded to a program storage area of a microcomputer, and then executed. Note that, in this case a program for the downloading is stored in the central unit in advance.

An example of the program medium is a detachable recording medium, e.g. tapes such as magnetic tapes and cassette tapes, disks including magnetic disks such as flexible disks and hard disks and optical disks such as CD-ROM, MO, MD, and DVD, cards such as IC cards (including memory cards) and optical cards, and recording media recording the program in a fixed manner, e.g. semiconductor memories such as mask ROM, EPROM (Erasable Programmable Read Only Memory), EEPROM (Electrically Erasable Programmable Read Only Memory), and flash ROM.

When the system is arranged so that communications networks including the Internet are connectable thereto, the recording medium may fluidly carry the program in such a manner as to allow the program to be downloaded via a communications network.

When, the program is downloaded via a communications network as above, the program for the downloading is preferably stored in the central unit in advance or installed from another recording medium.

The above-described embodiments do not put limits upon the present invention, and may be varied in many ways within the limits of the present invention. The variations of the embodiments are, for instance, as follows.

That is, a communication device of the present invention includes: communication means which can operate both in a master mode and in a slave mode; detection means which detects the presence of another communication device; storage means for storing detection information obtained by, for instance, the detection means; and determination means for selecting a communication target with reference to the detection information stored in the storage means, in such a manner as to reduce the number of dual communication devices which are on the network and operate in the master mode.

According to this arrangement, the detection means obtains the detection information concerning the communication device, and the storage means stores this detection information. Also, using the communication means, the communication device exchanges the detection information with said another communication device, so as to store, in the storage means, the detection information including the detection information of said another communication device. Furthermore, with reference to the detection information stored by the determination means, the communication device selects the communication target in such a manner as to reduce the number of the communication devices which are on the network and operate in the master mode. If the selected communication target is different from the current communication target, the communication means switches the communication target.

Thus, each communication device on the network can reconfigure the network in such a manner as to reduce the number of communication devices which are on the network and operate in the master mode. Since the number of such communication devices is reduced, the increase of overall power consumption of the network and the decrease of communication speed are restrained. On this account, a communication device which uses less power but has better processing speed is provided.

The above-described communication device of the present invention further includes notification means which notifies the outside of state information. According to this arrangement, the notification means can notifies the other devices in the terminal including the communication device of the state of the communication device, as the state information. Thus, the start of the switching of the communication target and the completion of the switching can be notified, and as a result, it is possible to temporarily stop the data transmission during the switching, and alter the routing information.

A communication method of the present invention includes: a detecting step for detecting the presence of a communication device; a communication step for carrying out a communication process supporting both the operation in the master mode and the operation in the slave mode; a storing step for storing the detection information obtained through the detecting step and the communication step; determining step for selecting the communication target with reference to the detection information, in such a manner as to reduce the number of dual communication systems which are on the network and operate in the master mode; and switching step for switching the communication target, if the selected communication target is different from the current communication target.

According to this method, the detection information concerning the communication device is obtained in the detecting step and this detection information is stored in the storing step. In the communication step, the communication device exchanges the detection information with another communication device, and thus the detection information including the detection information of said another communication device is stored in the storing step. In the determining step for selecting the communication target, the selection is made with reference to the stored detection information, in such a manner as to reduce the number of the dual communication systems which are on the network and operate in the master mode. Then the switching of the communication target is carried out in the switching step.

With this, the increase of overall power consumption of the network and the decrease of communication speed are restrained, and hence a communication device which uses less power but has better processing speed is provided.

The above-mentioned communication method of the present invention further includes a notification step for notifying the outside of the state information. According to this method, in the notification step, the state of the communication system is notified, as the state information, to other devices in the system including the communication device. Thus, the start of the switching of the communication target and the completion of the switching can be notified, and hence it is possible to temporarily stop the data transmission during the switching, and alter the routing information.

A program of the present invention enables a computer to execute the above-mentioned communication method. Thus, the computer executing the present invention can function as a communication device which reduces power consumption and restrains the decrease of communication speed.

A recording medium of the present invention records the above-mentioned program. Thus, it is possible to provide a recording medium which causes a computer to execute the above-mentioned program.

As described above, a network reconfiguration method, which is for reconfiguring a network including a plurality of sub-networks each including a node operating in a master mode and at least one node operating in a slave mode and being linked with the node operating in the master mode, comprises the steps of: (i) causing each node to detect a linkable node: (ii) generating detection information including a result of detection in the step (i); (iii) with reference to the detection information generated in the step (ii), selecting a node becoming the node operating in the master mode, in such a manner as to reduce a total number of nodes operating in the master mode; and (iv) constructing a sub-network including the node selected in the step (iii).

According to this method, to which node each node on the network is linkable is figured out with reference to the detection information generated in the step (ii). With this, the topology of the network can be transformed in such a manner as to reduce the number of master nodes. Since the number of the master nodes is reduced, the increase of overall power consumption of the network and the decrease of communication speed are restrained.

Note that, the step (iii) may include the sub-steps of: (a) searching a node to which all nodes on the network are linkable; (b) if the node to which all nodes on the network are linkable cannot be found out in the step (a), searching a combination of nodes to any one of which all nodes on the network are linkable; and a node which is linkable to at least two nodes in the combination of the nodes; (c) if the node linkable to said at least two nodes cannot be found out, increasing a number of nodes constituting the combination and repeating the step (b); and determining either the node found out in the step (a) or the combination of the nodes found out in the step (b) as the node(s) operating in the master mode.

In this case, the number of the master nodes is increased from 1and a possibility of network construction is examined. Thus, since the number of master nodes necessary for network construction is restrained to be minimum, the increase of overall power consumption of the network and the decrease of communication speed are restrained as much as possible.

As described above, the network reconfiguration method of the present invention is arranged such that the step (iv) includes a sub-step of causing a node to notify another node of a change of a link.

According to this method, a node can detect that another node is changing a link. With this, the transmission to a node which is changing a link is stopped and routing information is altered so that the loss of data due to data transmission to a node which is during the switching is prevented.

As described above, a node of the present invention includes: detection means for detecting a linkable node; storage means for storing detection information which includes a result of detection of the node, which is obtained by the detection means, and results of detections of other nodes constituting a network including sub-networks including said sub-network; communication means for exchanging the detection information with an outside; master selecting means for selecting, with reference to the detection information, a node becoming the node operating in the master mode, in such a manner as to reduce a total number of nodes operating in the master mode; and construction means for constructing a sub-network by selecting a mode of the node and selecting a target node to be linked with, with reference to a selection by the master selecting means.

With this, to which node each node on the network is linkable is figured out with reference to the detection information stored in the storage means. With this, the topology of the network can be can be transformed in such a manner as to reduce the number of master nodes. Since the number of the master nodes is reduced, the increase of overall power consumption of the network and the decrease of communication speed are restrained.

The master selecting means may include: first searching means for searching a node to which all nodes on the network are linkable; second searching means for, if the node to which all nodes on the network are linkable cannot be found out by the first searching means, searching a combination of nodes to any one of which all nodes on the network are linkable; and a node which is linkable to at least two nodes in the combination of the nodes; repeating means for, if the node linkable to said at least two nodes cannot be found out by the second searching means, increasing a number of nodes constituting the combination and repeating an operation carried out by the second searching means; and determining means for determining either the node found out by the first searching means or the combination of the nodes found out by the second searching means as the node(s) operating in the master mode.

In this case, the number of the master nodes is increased from 1and a possibility of network construction is examined. Thus, since the number of master nodes necessary for network construction is restrained to be minimum, the increase of overall power consumption of the network and the decrease of communication speed are restrained as much as possible.

When other nodes are identically arranged, a master node determined by the determining means is the master node for all nodes. Thus, it is unnecessary to provide a specialized node for determining the master node and transforming the network topology.

As described above, in the node of the present invention, the construction means includes notification means for notifying an outside of an execution of a switching to establish a link with the selected target node.

According to this arrangement, the switching of the target node to be linked with is notified to another node. Thus, said another node can stop data transmission and alter routing information, so that the loss of data due to data transmission to the node which is during the switching can be prevented.

A link change method of the present invention, which is for changing a link of a node which is eligible to be a part of a sub-network including a node operating in a master mode and at least one node operating in a slave mode and being linked with the node operating in the master mode, and is capable of operating both in the master mode and in the slave mode, comprises the steps of: (i) detecting a linkable node; (ii) receiving, from an outside, detection information including results of detections of other nodes constituting a network including sub-networks including said sub-network; (iii) updating the received detection information with reference to a result of detection of the node, which is obtained in the step (i); (iv) to the outside, sending the detection information updated in the step (iii); (v) with reference to the detection information updated in the step (iii), selecting a node becoming the node operating in the master mode, in such a manner as to reduce a total number of nodes operating in the master mode; (vi) based on a selection in the step (v), selecting a mode of the node and selecting a target node to be linked with; and (vii) if the target node selected in the step (vi) is different from a current target node, switching the target node.

According to this method, to which node each node on the network is linkable is figured out with reference to the detection information updated in the step (iii). With this, the topology of the network can be transformed in such a manner as to reduce the number of master nodes. Since the number of the master nodes is reduced, the increase of overall power consumption of the network and the decrease of communication speed are restrained.

Note that, the steps of the network reconfiguration method may be carried out by a computer with the help of a network reconfiguration program. Similarly, the steps of the link change method may be carried out by a computer with the help of a link change program.

Furthermore, by recording the network reconfiguration program or the link change program in a computer-readable recording medium, the network reconfiguration program or the link change program can be executed by an arbitrary computer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A network reconfiguration method for reconfiguring a network including a plurality of sub-networks each including a node operating in a master mode and at least one node operating in a slave mode and being linked with the node operating in the master mode, the network reconfiguration method comprising the steps of:
   (i) causing each node to detect a linkable node;
   (ii) generating detection information including a result of detection in the step (i);
   (iii) with reference to the detection information generated in the step (ii), selecting a node to become the node operating in the master mode so as to reduce a total number of nodes operating in the master mode; and
   (iv) constructing a sub-network including the node selected in the step (iii).

2. The network reconfiguration method as defined in claim 1, wherein, the step (iii) includes the sub-steps of:
   (a) searching for a node to which all nodes on the network are linkable;
   (b) if the node to which all nodes on the network are linkable cannot be found in step (a), searching a combination of nodes to any one of which all nodes on the network are linkable; and a node which is linkable to at least two nodes in the combination of the nodes;
   (c) if the node likable to said at least two nodes cannot be found, increasing a number of nodes constituting the combination and repeating step (b); and
   (d) determining either the node found in step (a) or the combination of the nodes found in step (b) as the node(s) operating in the master mode.

3. The network reconfiguration method as defined in claim 1, wherein, step (iv) includes a sub-step of causing a node to notify another node of a change of a link.

4. A node which is eligible to be a part of a sub-network including a node operating in a master mode and at least one node operating in a slave mode and being linked with the node operating in the master mode, and is capable of operating both in the master mode and in the slave mode, comprising:
   detection means for detecting a likable node;

storage means for storing detection information which includes a result of detection of the node, which is obtained by the detection means, and results of detections of other nodes constituting a network including sub-networks including said sub-network;

communication means for exchanging the detection information with another node;

master selecting means for selecting, by reference to the detection information, a node becoming the node operating in the master mode, in such a manner as to reduce a total number of nodes on the network operating in the master mode; and construction means for constructing a sub-network by selecting a mode of the node and selecting a target node to be linked with, by reference to a selection by the master selecting means.

5. The node as defined in claim 4, wherein, the master selecting means includes:

first searching means for searching a node to which all nodes on the network are linkable;

second searching means for, if the node to which all nodes on the network are linkable cannot be found by the first searching means, searching a combination of nodes to any one of which all nodes on the network are linkable; and a node which is linkable to at least two nodes in the combination of the nodes;

repeating means for, if the node linkable to said at least two nodes cannot be found by the second searching means, increasing a number of nodes constituting the combination and repeating an operation carried out by the second searching means; and determining means for determining either the node found by the first searching means or the combination of the nodes found by the second searching means as the node(s) operating in the master mode.

6. The node as defined in claim 4, wherein, the construction means includes notification means for notifying another node of an execution of a switching to establish a link with the selected target node.

7. A link change method for changing a link of a node which is eligible to be a part of a sub-network including a node operating in a master mode and at least one node operating in a slave mode and being linked with the node operating in the master mode, and is capable of operating both in the master mode and in the slave mode, the link change method comprising the steps of:

(i) detecting a linkable node;

(ii) receiving, from other nodes, detection information including results of detections of other nodes constituting a network including sub-networks including said sub-network;

(iii) updating the received detection information with reference to a result of detection of the node, which is obtained in the step (i);

(iv) sending the detection information updated in the step (iii) to other nodes;

(v) with reference to the detection information updated in the step (iii), selecting a node becoming the node operating in the master mode, in such a manner as to reduce a total number of nodes operating in the master mode;

(vi) based on a selection in the step (v), selecting a mode of the node and selecting a target node to be linked with; and (vii) if the target node selected in the step (vi) is different from a current target node, switching the target node.

8. A computer-readable recording medium storing a network reconfiguration program for causing a computer to execute a network reconfiguration method for reconfiguring a network including a plurality of sub-networks each including a node operating in a master mode and at least one node operating in a slave mode and being linked with the node operating in the master mode, the network reconfiguration method including the steps of:

(i) causing each node to detect a linkable node;

(ii) generating detection information including a result of detection in the step (i);

(iii) with reference to the detection information generated in the step (ii), selecting a node to become the node operating in the master mode, so as to reduce a total number of nodes operating in the master mode; and (iv) constructing a sub-network including the node selected in the step (iii).

9. A computer-readable recording medium storing a link change program causing a computer to execute a link change method for changing a link of a node which is eligible to be a part of a sub-network including a node operating in a master mode and at least one node operating in a slave mode and being linked with the node operating in the master mode, and is capable of operating both in the master mode and in the slave mode, the link change method including the steps of:

(i) detecting a likable node;

(ii) receiving, from other nodes, detection information including results of detections of other nodes constituting a network including sub-networks including said sub-network;

(iii) updating the received detection information with reference to a result of detection of the node, which is obtained in the step (i);

(iv) sending the detection information updated in the step (iii) to other nodes;

(v) with reference to the detection information updated in the step (iii), selecting a node to become the node operating in the master mode so as to reduce a total number of nodes operating in the master mode;

(vi) based on a selection in step (v), selecting a mode of the node and selecting a target node to be linked with; and (vii) if the target node selected in the step (vi) is different from a current target node, switching the target node.

* * * * *